Figure 1:
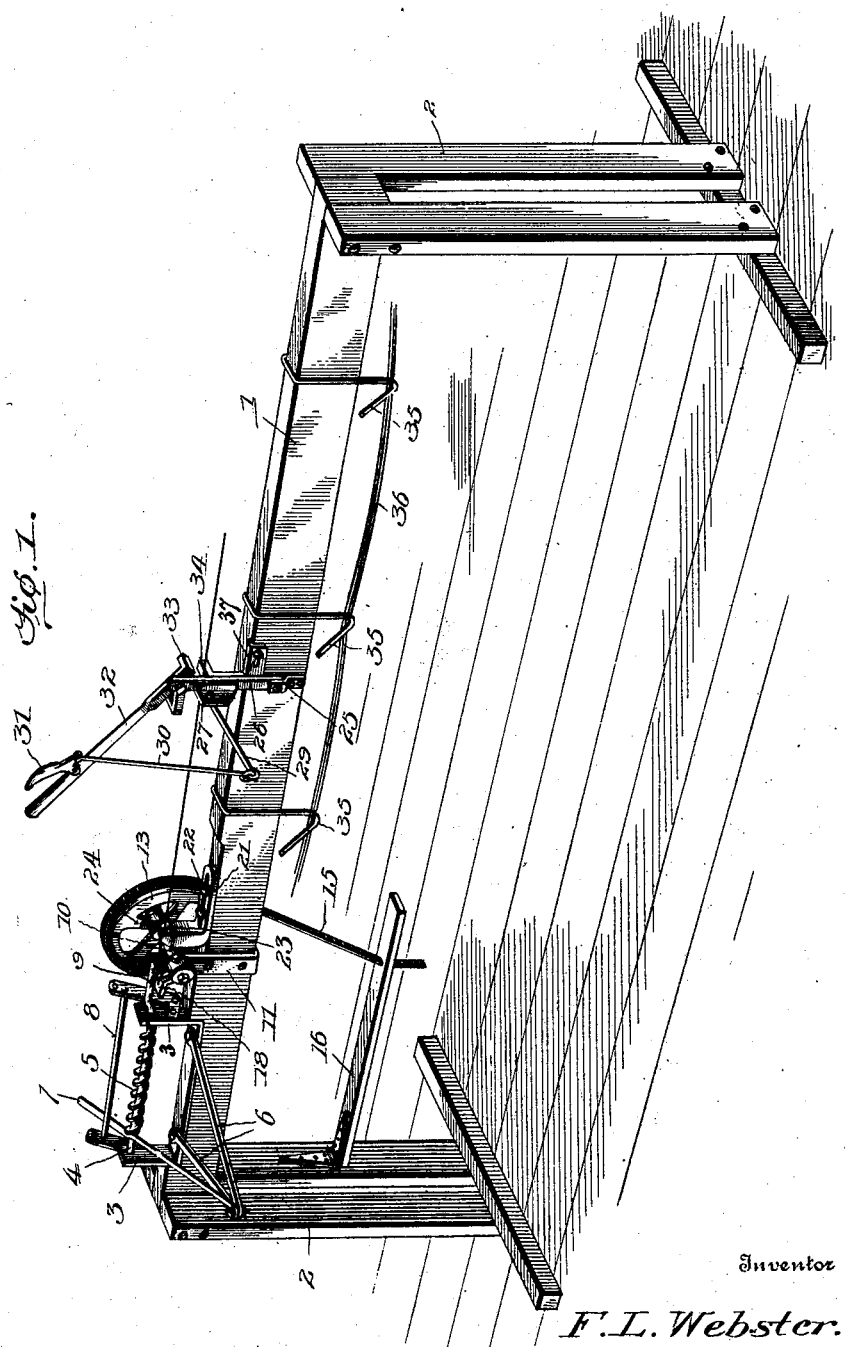

No. 688,564. Patented Dec. 10, 1901.
F. L. WEBSTER.
MACHINE FOR MAKING BALE TIES.
(Application filed Jan. 26, 1901.)

(No Model.) 2 Sheets—Sheet 1.

Witnesses
Harry S. Rohrer.
Herbert D. Lawson.

Inventor
F. L. Webster.
By Victor J. Evans Attorney

No. 688,564. Patented Dec. 10, 1901.
F. L. WEBSTER.
MACHINE FOR MAKING BALE TIES.
(Application filed Jan. 26, 1901.)
(No Model.) 2 Sheets—Sheet 2.
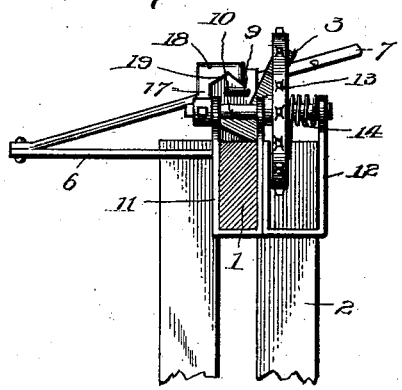
Witnesses
Harry S. Rohrer
Herbert D. Lawson
Inventor
F. L. Webster
By Victor J. Evans
Attorney

UNITED STATES PATENT OFFICE.

FRANK L. WEBSTER, OF CHEROKEE, KANSAS.

MACHINE FOR MAKING BALE-TIES.

SPECIFICATION forming part of Letters Patent No. 688,564, dated December 10, 1901.

Application filed January 26, 1901. Serial No. 44,918. (No model.)

*To all whom it may concern:*

Be it known that I, FRANK L. WEBSTER, a citizen of the United States, residing at Cherokee, in the county of Crawford and State of Kansas, have invented new and useful Improvements in Machines for Manufacturing Bale-Ties, of which the following is a specification.

This invention relates to new and useful improvements in machines for manufacturing bale-ties; and its primary object is to provide a device having means whereby wire may be looped at one end and twisted and stretched ready for use upon bales.
A further object is to provide a device of simple construction which is readily operated and which will effectively loop and twist wire.

With these and other objects in view the invention consists in providing a frame upon which is mounted a worm-shaft having a hook formed at one end thereof. A lever is mounted upon the worm and is adapted when slid thereon to revolve the same, causing the hook formed at one end thereof to turn therewith. A shaft is journaled upon the frame and motion is imparted thereto in any suitable manner. A dog of particular construction is secured to this shaft and is adapted to swing over the hook and loop the wire thereon.
The invention also consists in providing a stretcher and shears of particular construction, whereby the wire may be firmly held when the same is being looped and twisted and whereby it can be promptly cut after the above operation is completed.

The invention also consists in certain features of construction and combination of parts, which will be hereinafter fully described and claimed, and illustrated in the accompanying drawings, showing the preferred form of my invention, and in which—

Figure 1 is a perspective view of the device. Fig. 2 is a transverse section through the frame, showing the dog, &c., in elevation.
Fig. 3 is a side elevation of the looping mechanism. Fig. 4 is an inner elevation of the stretching and shearing mechanism. Fig. 5 is a detail view of the worm-shaft.

Referring to the drawings by numerals of reference, 1 is a beam which is supported between suitable standards 2, which are arranged, preferably, at opposite ends thereof.

Brackets 3 extend upward from the beam 1, and journaled therein are the ends of a shaft 4, having a worm 5 thereon. Laterally-extending rods 6 are secured to the beam at points between the brackets 3, and pivoted to the outer meeting ends thereof is a lever 7, which rests upon the worm 5 and is held in engagement therewith by means of a longitudinally-extending rod 8, which is supported by the brackets 3, before referred to. The forward end of the shaft 4 is provided with a right-angle extension, as shown at 9, and this extension lies at a point above and slightly in rear of a shaft 10, which is journaled within a yoke 11, extending on opposite sides of the beam 1 and secured thereto in any suitable manner. A second yoke 12 is secured to one side of the beam 1 and serves to support one end of the shaft 10, a sprocket-wheel 13 being secured to said shaft between the ends of the yoke 12. A coil-spring 14 is mounted upon the shaft, the opposite ends thereof being secured to the sprocket 13 and the yoke 12, respectively. A chain 15 is mounted upon the sprocket and is secured at its free end to a treadle 16, hinged to one of the standards 2, before referred to. It will thus be seen that when the treadle 16 is pressed downward the sprocket will be turned thereby, causing the spring 14 to wind upon the shaft 10, and as soon as the treadle is released said spring will return the shaft with the sprocket 13 to their original positions.

A dog of particular construction is mounted upon the shaft 10 and is adapted to move therewith. This dog is preferably formed of a shank 17, which terminates in a head 18, arranged at an angle thereto and preferably normally in a plane parallel to the beam 1. This head, as shown in Fig. 2, is provided at its inner edge with a hook 19 and is normally located at a point in rear of the right-angle extension 9 of the worm-shaft 4. A vertical block 20 is formed at one end of a slotted plate 21, and this plate is adapted to receive suitable securing-bolts 22, whereby the same is adjustably secured upon the upper edge of the beam 1 at a point in front of the shaft 10. A longitudinally-extending groove 23 is formed in the top of this block in alinement with the center of the angle extension 9 of the shaft 4, and a finger or projection 24 is arranged upon the top of the block at one side of the groove. A bracket 25 is secured to one side of the beam 1, and pivoted thereto is a strip 26, having an ear 27 extending therefrom, upon which is pivoted a cutting-blade 28, which is formed at one end of a rod 29. The outer end of this rod is connected by means of a link 30 to a lever 31, hinged adjacent to the handle of a second lever 32. This lever 32 is fulcrumed at a point adjacent to the upper end of the strip 26 and is provided with a lateral extension 33, adapted when the lever 32 is swung upward to bear upon a second lateral extension 34, which is upon the strip 26. Hangers, as 35, are arranged upon the beam 1 at suitable intervals and are adapted to support wires 36 before they have been formed into bale-ties.

In operation a wire is placed between the extensions 33 and 34 and within the groove 23 of the block 20. The end of the wire is placed beneath the angle extension 9 of the shaft 4 and over the head 19 of the dog. The lever 32 is then swung upward upon its fulcrum and will firmly clamp the wire upon the extension 34. The treadle 16 is pressed downward, causing the sprocket 13 to revolve and swinging the dog upward, causing the head 18 thereof to pass over the end 9. Said dog will then clamp the end of the wire against the block 20. The lever 7 is drawn toward the sprocket 13 and will cause the shaft 4 to revolve, thereby twisting that portion of the wire which is between the extension 9 and the block 20. After the wire has been twisted the lever 31 is pressed toward the handle of the lever 32, thereby causing the cutting-blade 28 to swing downward. This will cut the wire resting upon the extension 34, and the same is then removed from the extension 9, the treadle 16 having first been released. The lever 7 is then returned to its normal position and the above operation will then be repeated.

If desired, an adjustable stop 37 may be mounted upon the beam 1, so as to limit the movement of the strip 26.

The finger or extension 24 before referred to is provided so that the wire may be readily placed within the groove 23, said finger preventing the same from slipping over the inner edge of the block 20.

In the foregoing description I have embodied the preferred form of my invention, but I do not wish to be understood as limiting myself thereto, as I am aware that modifications may be made therein without departing from the principle or sacrificing any of the advantages thereof, and I therefore reserve to myself the right to make such changes as fairly fall within the scope of my invention.

Having thus described the invention, what is claimed, and desired to be secured by Letters Patent, is—

1. The combination with a frame; of a shaft journaled thereon, a worm upon the shaft, a lever pivoted at one end and bearing upon the worm, and a bar mounted lengthwise of the frame to bear upon the free end portion of the lever and hold it in engagement with the worm, and said lever being adapted when swung upon its pivot to revolve the worm and its shaft.

2. The combination with a frame; of a shaft journaled thereon, a right-angle extension thereto at one end, a worm upon said shaft, a lever pivoted upon the frame and engaging the worm, and means for holding the lever normally in engagement with the worm, said lever being adapted when swung upon its pivot to turn the worm and its shaft.

3. The combination with a frame, of a shaft journaled thereon, formed with a right-angle extension thereto at one end, a second shaft journaled adjacent to said extension, a sprocket-wheel for imparting motion to said second shaft, a chain on the sprocket-wheel, a lever to actuate the chain, a dog mounted upon the shaft of the sprocket-wheel and adapted to swing over the extension of the other or worm-shaft, and means for revolving the shaft of the extension and the worm thereon.

4. The combination with a frame; of a worm-shaft journaled thereon, a right-angle extension at one end of the shaft, a shaft journaled upon the frame adjacent to the extension, a dog upon said latter shaft, and means for imparting motion to the worm shaft and to the latter shaft of the dog independently of each other, said dog being adapted to swing over the extension.

5. The combination with a frame; of a worm-shaft journaled thereon, a lateral extension thereto, a lever pivoted upon the frame and normally engaging the worm, said lever being adapted to swing upon its fulcrum to revolve the worm, a shaft journaled upon the frame adjacent to the lateral extension, a dog secured to the last-named shaft, means for imparting motion to said shaft and thereby swinging the dog over the lateral extension, and a block adjacent to the shaft of the dog and having a groove therein in alinement with the center of the lateral extension.

6. The combination with a frame; of a worm-shaft journaled thereon, a lateral extension to said shaft, a lever engaging the worm and adapted when swung upon its fulcrum to revolve said worm, a shaft journaled upon the frame adjacent to the lateral extension, a dog secured thereto, a hooked head to the dog adapted to swing over the lateral extension when motion is imparted to the shaft of the dog, an adjustable block mounted upon the frame and having a groove therein in alinement with the center of the lateral extension and of the head of the dog, and a finger upon said block.

7. The combination with a frame; of a worm-shaft journaled thereon, a lateral extension to said shaft at one end thereof, means for revolving the worm-shaft and its extension, a shaft journaled upon the frame adjacent to the extension, a dog secured to the shaft, a hooked head thereto adapted to swing over the extension, an adjustable block secured upon the frame and having a groove therein in alinement with the center of the extension and of the head, a strip pivoted to the frame, a lateral extension to said strip, a lever fulcrumed upon the strip and having a lateral extension at the inner end thereof, a cutting-blade pivoted to the strip, a lever fulcrumed upon the lever of the strip, and a link connection between said lever and the cutting-blade.

8. The combination with a beam and standards therefor; of a worm-shaft journaled upon the beam, rods extending from said beam, a lever pivoted thereto and adapted to engage the worm, a rod for holding said lever normally in engagement with the worm, a lateral extension at one end of the worm-shaft, a shaft journaled upon the beam, a sprocket secured thereto, a dog secured to said shaft, a hooked head thereto adapted to swing over the lateral extension, a spring connected at opposite ends to the sprocket and beam, a treadle hinged to one of the standards, a chain mounted upon the sprocket and secured to the treadle, a block adjustably secured to the beam and having a groove therein in alinement with the center of the lateral extension and of the head of the dog, a strip hinged to the beam, a lateral extension thereto, a lever fulcrumed upon said strip and having a lateral extension adapted to bear upon the extension of the strip, a lever fulcrumed upon the lever of the strip, a link extending therefrom, and a cutting-blade fulcrumed upon the strip and connected to said link.

In testimony whereof I affix my signature in presence of two witnesses.

FRANK L. WEBSTER.

Witnesses:
L. B. WILLIAMS,
P. C. ROBBINS.